United States Patent
Porsche et al.

[15] 3,658,357
[45] Apr. 25, 1972

[54] SLIDING VEHICLE

[72] Inventors: Ferdinand Alexander Porsche, Doffingen; Theodor Bauer, Leinfelden, both of Germany

[73] Assignee: Firma Dr. -Ing. h.c.F. Porsche K.G., Stuttgart-Zuffenhausen, Germany

[22] Filed: June 24, 1969

[21] Appl. No.: 835,939

[30] Foreign Application Priority Data

Aug. 2, 1968 Germany...................P 17 80 123.9

[52] U.S. Cl.............................280/16, 280/21, 280/25
[51] Int. Cl...................................................B62b 13/04
[58] Field of Search..............280/21, 21.1, 21.2, 21.3, 21.5, 280/21.6, 21.7, 15, 16, 17, 26, 27, 25

[56] References Cited

UNITED STATES PATENTS

| 1,907,321 | 5/1933 | Hilstrom | 280/9 |
| 2,883,205 | 4/1959 | Dulski | 280/16 |
| 3,132,873 | 5/1964 | Sychowski et al. | 280/9 |
| 3,338,589 | 8/1967 | Barton et al. | 280/25 |
| 3,425,707 | 2/1969 | Horiuchi et al. | 280/21 |

FOREIGN PATENTS OR APPLICATIONS

| 945,707 | 12/1948 | France | 280/16 |
| 465,418 | 12/1968 | Switzerland | 280/21 |

Primary Examiner—Benjamin Hersh
Assistant Examiner—Winston H. Douglas
Attorney—Craig, Antonelli & Hill

[57] ABSTRACT

A one-track, steerable sled consisting essentially of a supporting frame with a pivotably articulated front and rear runner attached thereto and a steering mechanism. The steering mechanism is associated with the front runner and the rear runner is connected with the supporting frame by guides substantially in the form of a parallelogram and cushioned by a bilaterally effective spring element. This arrangement permits good contact of the front runner with the lane of travel and permits shocks to be absorbed.

21 Claims, 4 Drawing Figures

3,658,357

SLIDING VEHICLE

BACKGROUND OF THE INVENTION

The present invention relates to a one-track, steerable sliding vehicle or sled with a supporting frame, and more particularly, to a sled with a supporting frame to which there are hingedly attached a steering mechanism with a pivotably mounted front steering runner and a rear runner.

Conventional one-track sleds consist of a supporting frame provided with a non-resilient seat. In those devices, a pivotable steering mechanism with a rigidly disposed steering runner is attached to the supporting frame in addition to a rear runner which is rigidly mounted. However, due to the rigid arrangement of the runners, the sliding properties of this sport vehicle are extremely unsatisfactory. Additionally, driving in hilly and bumpy terrain is uncomfortable and inconvenient for the driver, since the seat is not cushioned against vibrations. In an attempt to overcome these disadvantages, it has been suggested that a sled should be equipped with a steering runner which is pivotably mounted to the steering mechanism and a rear runner which is attached to the front part as well as to the rear part of the supporting frame. In this arrangement, the seat would be supported by a spring element cooperating with the rear section of the frame. Due to the resiliency of the spring element, however, the seat is inclined rearwardly with respect to the lane direction being followed by the driver, and therefore, the driver is placed into an unfavorable driving position which could lead to a crash. Furthermore, the stresses occurring during driving of the vehicle are exerted mainly on the rear section of the rear runner, thereby relieving the front runner of its load and accordingly, making controlled steering very difficult.

In both of the above-mentioned constructions, it is felt to be a further disadvantage that the rear runners constitute fixed and bulky structural components which become obstacles during transportation of the sled, especially to other people.

SUMMARY OF THE INVENTION

It is the aim of the present invention to overcome the aforementioned disadvantages by providing a one-track, steerable sliding vehicle wherein the rear runner is guided at the supporting frame by guides arranged in the manner of a parallelogram and resiliently supported or cushioned by a bilaterally effective spring element. This assures that the front runner maintains good contact with the lane in all ranges of stress or load of the sled so that the steering properties and, consequently, the sliding properties of the sport vehicle are extraordinarily satisfactory. Further, driving on an undulated bumpy terrain is more pleasant since the shocks and vibrations are absorbed by the runner and the spring element. The guides cooperating with the rear runner extend substantially parallel to one another, with the front guide of the two guides being shorter than the rear guide. Because of this feature, the rear runner forms an angle with the lane which becomes larger with increasing stress or loads on the resilient support, whereby a free sliding of the sled is made possible. Driving in deep snow, therefore, is made possible without any difficulties.

The spring element consists of a conventional shock absorber which is hingedly mounted to the supporting frame and the rear runner. The mounting of the spring element at the rear runner is affected by a readily releasable clamping lock which makes possible the dismantling of the shock absorber from the runner so that the runner can be pivoted upward toward the supporting frame. This feature is of great advantage during the transportation of the sled. Further, the runner is thereby effectively and functionally cushioned. The rear runner includes a fitting comprising the mounting for the rear guide and for the shock absorber which makes possible a simple and easily producible mounting part. In the ready-for-driving condition of the sled, it is a further advantage that the rear guide should form an angle of at least 45° with the shock absorber, and the shock absorber should form an angle of at least 90° with the rear runner.

Accordingly, it is an object of the present invention to provide a one-track, steerable sled which avoids by simple means the shortcomings and disadvantages encountered in the prior art.

It is an object of the present invention to provide a one-track, steerable sled which has improved steering as well as sliding properties.

Another object of the present invention is to provide a sled which is cushioned so that it can be driven, even in very difficult terrain, rapidly and without any difficulties.

A further object of the present invention is to provide a resilient cushioning for a runner of the sled which can be dismantled so that the runner can be pivoted upward toward the supporting frame of the sled in order to allow easy transportation.

BRIEF DESCRIPTION OF THE DRAWINGS

These and further objects, features and advantages of the present invention will become more obvious from the following description when taken in combination with the accompanying drawings which show, for purposes of illustration only, an embodiment in accordance with the present invention, and wherein.

DETAILED DESCRIPTION OF THE DRAWINGS

Figure 1:
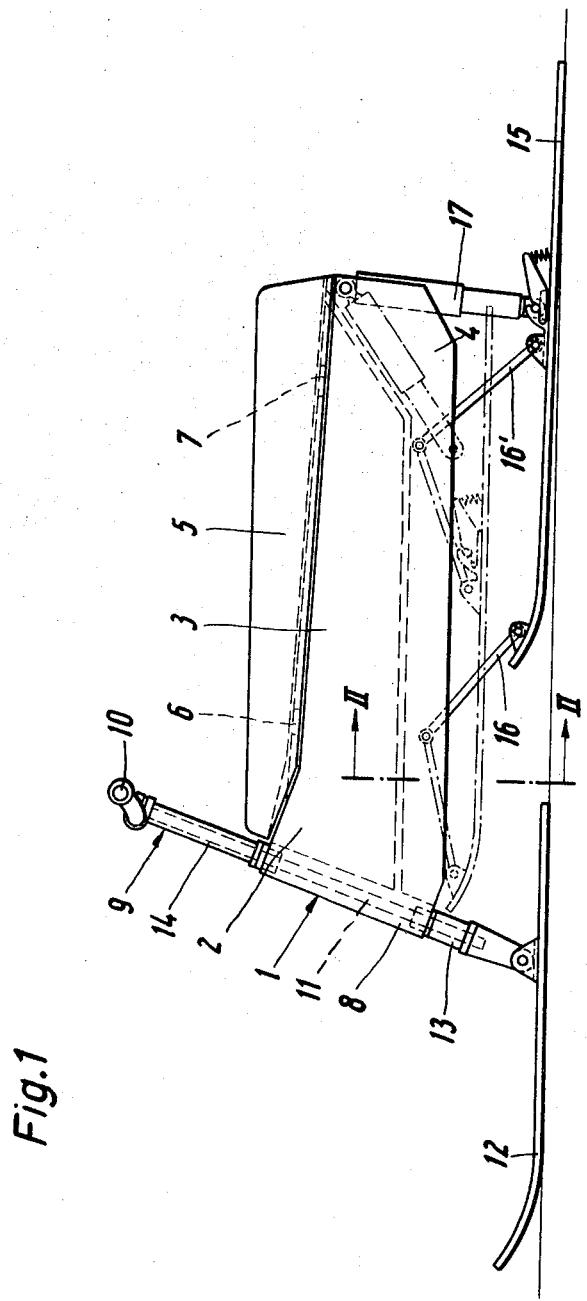
FIG. 1 is an elevational side view of a sled according to the present invention.

The sled 1, as shown in FIG. 1, consists essentially of a structurally rigid supporting frame 2 manufactured from a synthetic material. The supporting frame 2 is constructed as a hollow body with hollow spaces 3, 4. An upholstered seat 5 is disposed in the upper zone of the supporting frame 2. The upholstered seat 5 is mounted to the supporting frame 2 by hinge means 6, 7 and closes off the hollow space 3 which forms a storage compartment. Furthermore, a supporting tube 8 is integrally connected with and reinforces the bow section of the supporting frame 2. The supporting tube 8 also serves to receive a steering mechanism 9 which consists essentially of a steering column 11 provided with a steering device such as a handlebar 10 and a hingedly mounted or articulated front runner 12. The steering column 11 is held in position in the supporting tube 8 by a stop or abutment member 13 and a supporting member 14. The stop member 13 is fixedly connected with the steering column 11, while the supporting member 14 is readily detachable by hand and cooperates, by way of a threaded joint (not shown in the drawing), with the steering column 11. A rear runner 15 also cooperates with the supporting frame 2 and is guided by means of guide members 16, 16'. The rear runner 15 is resiliently supported or cushioned by a conventional shock absorber 17, which is rotatably mounted to the supporting frame 2 by conventional means such as bolts or the like. The guide members 16, 16' are of unequal length, with the guide member 16 being shorter than the guide member 16'.

Figure 2:
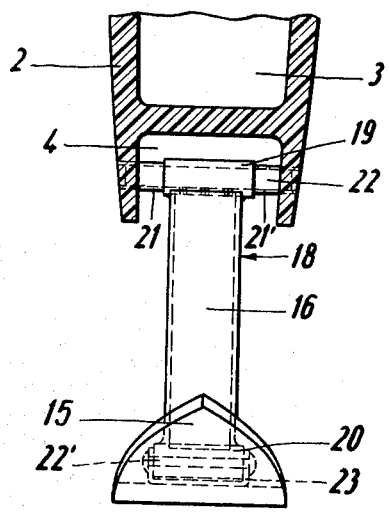
FIG. 2 is a sectional view along the line II—II of FIG. 1 on an enlarged scale.

FIG. 2 shows one possible arrangement of the bearing of the guide member 16 at the supporting frame 2 in addition to the rear runner. According to the present invention, the guide member 16 comprises a square hollow bar 18 provided with bearing bushings 19, 20 on the opposite ends. The bearing bushings 19, 20 are connected by bonding means such as welding with the square hollow bar 18. Receiving bushings or sockets 21, 21' are countersunk into the inner sides of the walls of cavity 4 for receiving the guide member 16 at the supporting frame 2. The bearing bushing 19 of the guide member 16 is articulated to the receiving bushings 21, 21' by a pin 22. The bearing bushing 20 of the guide member 16 cooperates, by way of a pin 22', with a receiving part 23 manufactured from sheet metal and which is attached to the rear runner 15 by connecting means such as screws or the like. The arrangement of the guide member 16' and its mounting at the supporting frame 2 as well as at the runner 15 is similar to that of guide member 16 described above.

Figure 3:
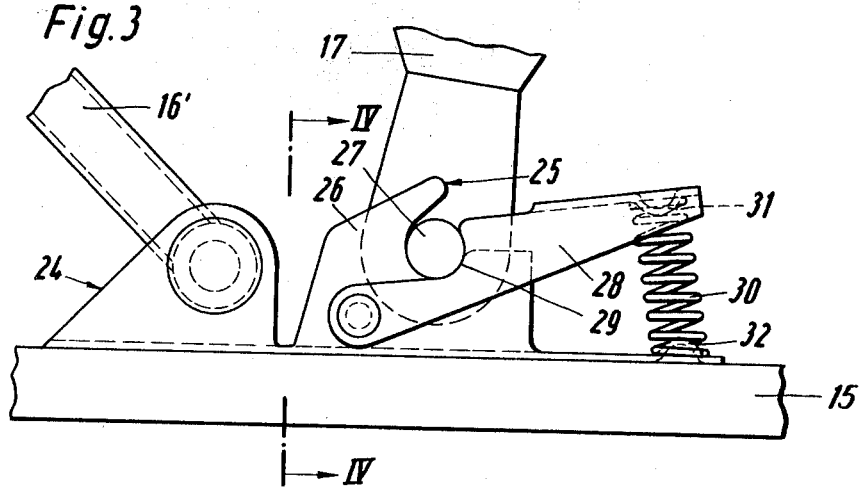
FIG. 3 is a partial view of a rear runner according to FIG. 1 on an enlarged scale.
Figure 4:
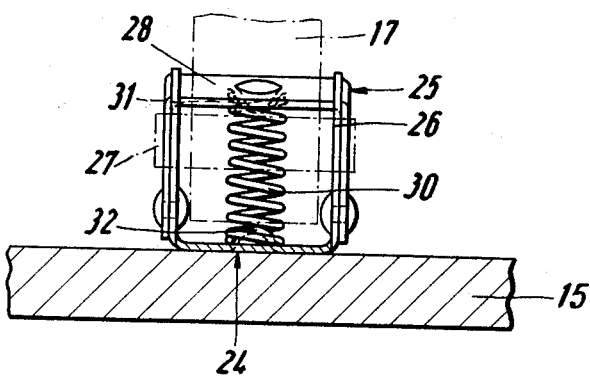
FIG. 4 is a sectional view along the line IV—IV of FIG. 3.

As seen in FIGS. 3 and 4, the rear runner 15 is provided with a fitting part 24 which cooperates with the guide member 16' and to which the shock absorber 17 is affixed by a readily releasable clamping lock designated generally by the numeral 25. The turnbuckle 25 consists of a fixing part 26 for a bolt 27 which is fixedly connected with the shock absorber 17. A pawl 28 is pivotedly mounted to the fixing part 26 and has a section 29 surrounding the bolt 27 which can be actuated against the force of a compression spring 30. The compression spring 30 is held in position by means of indentations 31, 32 provided at the fitting part 24 and at the pawl 28.

With the clamping lock 25, it is possible to separate the shock absorber 17 and the rear runner 15 from each other, whereby these two parts can be brought into the transporting position shown in dot-dash lines in FIG. 1. Furthermore, the steering mechanism 9 can be readily detached from the supporting frame 2 and accommodated in the hollow space 3 without any difficulties. Accordingly, it is possible to convert the sled 1 by simple means into a compact readily transportable winter sport vehicle.

While we have shown and described only one embodiment in accordance with the present invention, it is understood that the same is not limited thereto but is susceptible of numerous changes and modifications as known to a person skilled in the art, and we, therefore, do not wish to be limited to the details shown and described herein but intend to cover all such changes and modifications as encompassed by the scope of the invention.

We claim:

1. A one-track gliding sled comprising:
essentially a supporting frame;
a steering mechanism with a front runner rotatably associated with the supporting frame;
a rear runner operatively connected to the supporting frame;
linkage means connected to the supporting frame and the rear runner for guiding the rear runner such that an angle is formed by the rear runner with the lane of travel, facing the forward direction of travel and increasing upwardly with increasing stress; and
a bilaterally effective spring element operatively connected to the supporting frame for cushioning the rear runner.

2. A sled according to claim 1, wherein the means for guiding includes guide elements cooperating with the rear runner extending at a spacing with respect to each other.

3. A sled according to claim 2, wherein a forward guide element is shorter than a rear guide element.

4. A sled according to claim 1, wherein the bilaterally effective spring element consists essentially of a shock absorber hingedly connected at the supporting frame and at the rear runner by a readily releasable clamping lock means.

5. A sled according to claim 1, wherein the rear runner has a fitting part comprising the mounting for the guide means and for the bilaterally effective spring element.

6. A sled according to claim 5, wherein the spring element consists essentially of a shock absorber hingedly connected to the supporting frame and at the rear runner by a readily releasable clamping lock means.

7. A sled according to claim 1, wherein a rear guide element of the guide means forms an angle of at least 45° with the bilaterally effective spring element when the sled is in the ready-for-driving condition.

8. A sled according to claim 7, wherein the guide means cooperating with the rear runner consists of at least two guide elements which extend at a spacing with respect to each other.

9. A sled according to claim 8, wherein one guide element is a forward guide element which is shorter than the rear guide element.

10. A sled according to claim 1, wherein the bilaterally effective spring element forms an angle of at least 90° with the rear runner when the sled is in the ready-for-driving condition.

11. A sled according to claim 10, wherein the bilaterally effective spring element consists essentially of a shock absorber hingedly articulated to the supporting frame and to the rear runner by a readily releasable clamping lock means.

12. In a sled having a supporting frame, a steering mechanism with a front runner rotatably associated with the supporting frame and a rear runner operatively connected to the supporting frame wherein the improvement comprises a plurality of guide elements extending generally in the same direction pivotably connected between the supporting frame and the rear runner, a forward one of the guide elements being shorter than a rear one of the guide elements, and a bilaterally effective spring element hingedly connected between the supporting frame and the rear runner.

13. A sled according to claim 12, wherein the spring element forms an angle of at least 90° with the rear runner when the sled is in the ready-for-driving condition.

14. A sled according to claim 13, wherein the guide elements form an angle of at least 45° with the spring element when in the ready-for-driving condition.

15. A sled according to claim 14, wherein the bilaterally effective spring element consists essentially of a shock absorber connected between the supporting frame and the rear runner by readily releasable clamping lock means.

16. A sled according to claim 15, wherein the rear runner has a fitting part comprising the mounting for a guide element and for the bilaterally effective spring element.

17. A sled according to claim 16, wherein the fitting part includes the readily releasable clamping lock means.

18. A sled according to claim 17, wherein a bolt is fixedly associated with the shock absorber, and the turnbuckle means includes a fixing part adapted to receive the bolt and a pawl pivotably connected to the fixing part for surrounding the bolt.

19. A sled according to claim 18, wherein the pawl is actuated by a spring means.

20. A sled according to claim 12, wherein the supporting frame consists essentially of a rigid hollow body having hollow spaces therein accessible from the outside.

21. A sled according to claim 20, wherein the outer walls of the supporting frame are mutually supported by a connecting wall means.

* * * * *